United States Patent

Inoue et al.

[15] 3,671,602

[45] June 20, 1972

[54] TRANSALKYLATION OF AROMATIC HYDROCARBONS

[72] Inventors: Takehisa Inoue; Masaki Sato; Takeshi Hashiguchi, all of Kamakura, Japan

[73] Assignee: Toray Industries, Inc., Tokyo, Japan

[22] Filed: Feb. 24, 1970

[21] Appl. No.: 13,756

[30] Foreign Application Priority Data

Feb. 25, 1969 Japan....................................44/13599
March 31, 1969 Japan....................................44/23880
March 31, 1969 Japan....................................44/23881
April 14, 1969 Japan....................................44/28233

[52] U.S. Cl. ..........................................................260/672 T
[51] Int. Cl. ..................................................................C07c 3/62
[58] Field of Search................................................260/672 T

[56] References Cited

UNITED STATES PATENTS 3,281,483  10/1966  Benesi et al. .......................260/672 T
3,377,400  4/1968  Wise....................................260/672 T
3,527,826  9/1970  Sonoda et al.......................260/672 T
3,541,174  11/1970  Inoue et al.........................260/672 T
3,553,277  1/1971  Sato et al............................260/672

Primary Examiner—Curtis R. Davis
Attorney—Sherman and Shalloway

[57] ABSTRACT

A process for the transalkylation of aromatic hydrocarbons of nine carbon atoms which comprises heat contacting the starting feed containing at least one aromatic hydrocarbon of nine carbon atoms as a main component in the presence of hydrogen gas with a catalyst selected from the group consisting of:

a. dealkalized mordenites,
b. compositions composed of a dealkalized mordenite and at least one metal selected from metals of Group I$b$ or VI$a$ of the Periodic Table, and
c. compositions composed of a dealkalized mordenite, an aluminum fluoride and at least one metal selected from metals of Group I$b$ or VI$a$ of Mendelejeff's Periodic Table.

10 Claims, No Drawings

TRANSALKYLATION OF AROMATIC HYDROCARBONS

This invention relate to the transalkylation of aromatic hydrocarbons containing nine carbon atoms.

The transalkylation of aromatic hydrocarbons is an important reaction for the synthesis of various valuable high molecular substances, and recently it has attracted a great attention. As catalysts for the transalkylation silica-alumina catalysts, metal oxide-silica catalysts, alumina-boria catalysts and the like have been known. However, these known catalysts have such defects as low conversion and short catalyst life. Therefore, a catalyst capable of attaining a high conversion and having a long life has been much desired in the art.

A primary object of this invention is to provide a process for the transalkylation of aromatic hydrocarbons of nine carbon atoms with a catalyst exhibiting an excellent catalytic activity and having a long life.

Another object of this invention is to provide a process for the preparation of tetramethylbenzene and xylene at high yields by the disproportionation of trimethylbenzene with the use of the above catalyst.

Still another object of this invention is to provide a process for preparing ethylbenzene at high yields by the transalkylation of ethyltoluene and benzene.

In accordance with this invention there a process is provided for the transalkylation of aromatic hydrocarbons of nine carbon atoms which comprises heat contacting the starting feed containing at least one aromatic hydrocarbon of nine carbon atoms as a main component in the presence of hydrogen gas with a catalyst selected from the group consisting of:

a. dealkalized mordenites,
b. compositions composed of a dealkalized mordenite and at least one metal selected from metals of Group Ib or VIa of Mendelejeff's Periodic Table, and
c. compositions composed of a dealkalized mordenite, an aluminum fluoride and at least one metal selected from metals of Group Ib or VIa of Mendelejeff's Periodic Table.

The process of this invention will be detailed hereinbelow.

The first catalyst to be used in the process of this invention is a dealkalized mordenite. The term "mordenite" used herein means a kind of zeolite which consists predominantly of an alkali metal or alkaline earth metal aluminosilicate and which shows characteristic spectra in the vicinity of $2\theta = 13.4$, $25.6$ and $27.7$ in the X-ray diffraction spectrum by the Cu-k$\alpha$ line. The mordenite includes natural and synthetic products. Both natural and synthetic mordenites may be used in the process of this invention. It is essential that these mordenites should be dealkalized products. As is well-known in the art, the term "-dealkalization" means a treatment of removing alkali components (alkali metals and alkaline earth metals being included) from mordenites by substituting them by other cations. It is preferable that at least 60 mole percent, especially at least 80 mole percent, of the alkali metals and alkaline earth metals contained in the mordenite are removed therefrom. Such dealkalization treatment may be advantageously achieved by substituting ions of alkali metals and alkaline earth metals $H^+$ or $NH_4^+$ by the cation-exchange with an acid or ammonium salt. As the acid there may be preferably used inorganic acids such as hydrochloric acid and nitric acid, and organic acids such as formic acid, acetic acid and oxalic acid. Water-soluble ammonium salts such as ammonium chloride, ammonium nitrate and ammonium carbonate are preferably used as the ammonium salt. A preferable acid concentration adopted in the dealkalizing treatment is in the range of from 0.5 to 6 N. When the ammonium salt is used, it is preferable that its concentration is 5 to 20 percent by weight. The treatment temperature may be varied within the range of from room temperature to 100° C., but it is generally preferred to effect the treatment at a temperature of about 70° to about 100° C. The treating time varies depending on the treatment temperature, but generally the treatment is conducted for about 6 to about 100 hours. The dealkalized mordenite is washed with water, dried and calcined at 400° to 650° C. in air, nitrogen, helium or hydrogen. The so calcined product is used as the catalyst. During the calcination, $NH_4^+$ ions made present by the ion-exchange with an ammonium salt are converted to $H^+$ ions.

The second catalyst to be used in the process of this invention is a composition composed of the above-mentioned dealkalized mordenite and at least one metal selected from metals of Group Ib or VIa of Mendelejeff's Periodic Table. The co-presence of at least one metal of Group Ib or VIa improves the catalytic activity to some extent as compared with the catalyst composed of the dealkalized mordenite alone. The "metal of Group Ib" includes Cu, Ag and Au, and the "metal of Group IVa" means W, Mo and Cr. As the method of making such metal co-existent with the dealkalized mordenite a method is generally adopted comprising dipping the dealkalized mordenite in an aqueous solution or suspension of a metal salt and calcining the same at a temperature of about 400° to about 650° C. As the metal salt, oxides, chlorides, sulfides, nitrates and the like are used. The use of water-soluble metal salts is preferred. The calcination is generally conducted in air, but it may be also effected in an inert gas such as nitrogen and helium, or in a hydrogen gas. The metal of Group Ib or VIa supported on the dealkalized mordenite is present in the form of the metal salt after the calcination, but it is reduced to the form of the metal under the transalkylation conditions by means of hydrogen present in the reaction system. The metal content in the catalyst is 0.05 to 30 percent by weight, preferably 0.5 to 10 percent by weight.

In addition to the above-mentioned impregnation method, an ion-exchange method may be adopted to support the metal cations on the dealkalized mordenite. The ion-exchange may be achieved by treating a mordenite substituted by alkaline earth metal ions or ammonium ions with an aqueous solution of a desired metal.

Metals may be supported on the dealkalized mordenite by other conventional methods such a precipitating method and mixing method.

The third catalyst to be used in the process of this invention is a composition of a dealkalized mordenite, at least one metal selected from metals of Group Ib or VIa of Mendelejeff's Periodic Table, and an aluminum fluoride. The activity of the catalyst is further improved by making an aluminum fluoride co-existent with the above-mentioned metal-mordenite system. Further, the presence of the aluminum fluoride decreases deposition of carbon on the catalyst.

Any aluminum fluoride may be used in the process of this invention. Preferable examples are $\alpha,\beta$-aluminum trifluoride hydrates prepared in accordance with methods described in E. Brand, Am. Chem. Phys., (8) 1, 60(1904), A. Mazzuchlli, Atti. Accad. Lincei, (5) 16i, 775(1907), and W.F. Fhret, F.T. Frere, J. Am. Chem. Sec., 67, 64(1945); basic aluminum fluorides prepared in accordance with methods described in J. M. Cowley, T.R. Scott, J. Am. Chem. Sec., 70, 105(1948) and R. L. Johnson, B. Siegel Nature, 210, 1256(1966); and $\beta,\gamma$-$AlF_3$ prepared by calcining $\alpha,\beta$-$AlF_3 \cdot 3H_2O$ at a temperature not exceeding 600° C., preferably not exceeding 500° C. Similarly effective aluminum fluorides may be prepared by passing an excess of anhydrous hydrogen fluoride through a reaction tube packed with alumina, aluminum hydroxide or a mixture of these at 200° – 500° C., or by passing an excess of anhydrous hydrogen fluoride through a reaction tube packed with aluminum chloride at 200° – 400° C. In case such aluminum fluorides are used as one component of the catalyst in this invention, purification of them is not necessary and those prepared in the form of a mixture of such aluminum fluorides may be used to give sufficient results.

The amount of the aluminum fluoride is 1 to 40 percent by weight, preferably 5 to 20 percent by weight, based on the dealkalized mordenite. Various methods are applicable to the incorporation of the aluminum fluoride, but sufficient results are obtained merely by mixing a prescribed amount of the aluminum fluoride with other components.

As the method of preparing the above-mentioned three-component type catalyst there may be cited (1) a method comprising adding an aluminum fluoride to a dealkalized mordenite, supporting thereon a metal component by any of the above-mentioned metal-supporting methods, and thereafter calcining the same, (2) a method comprising adding a metal component to a dealkalized mordenite, adding thereto an aluminum fluoride and calcining the composition, (3) a method comprising adding an aluminum fluoride to a dealkalized mordenite, calcining the mixture, adding to the calcined product a metal component, and thereafter calcining the composition, and (4) a method comprising calcining a dealkalized mordenite, adding a metal component and an aluminum fluoride to the calcined product and thereafter calcining the composition. All of the catalysts prepared in accordance with the above-mentioned methods exhibit excellent catalytic activity. The above calcination may be conducted under the same conditions as already described with respect to the dealkalization of mordenite.

The catalyst to be used in the process of this invention may further contain a metal of Group VIII of Mendelejeff's Periodic Table, such as nickel, cobalt, platinum and palladium besides the above-mentioned components. Such additional metal of Group VIII is incorporated in an amount of 0.05 to 5 percent by weight based on the final composition. The incorporation of the additional metal is performed by impregnation, precipitation, co-precipitation or ion-exchange.

It has been found that when a dealkalized mordenite, which has been washed with water after dealkalization, then dried at 100° to 600° C. and treated with a fluorinating agent, is used as one catalyst component the catalytic activity is much improved and deposition of carbon on the catalyst can be greatly reduced. Preferable examples of such fluorinating agent includes ammonium fluoride, hydrofluoric acid, boron fluoride and silicon fluoride. The fluorinating treatment may be achieved by known methods such as an impregnation method using a solution of a fluorine compound and a method adsorbing vapor of a fluorine compound.

As one preferable embodiment of the transalkylation reaction of this invention, the disproportionation of trimethylbenzene is mentioned. According to this embodiment, trimethylbenzene is selected as the aromatic hydrocarbon of nine carbon atoms and it is heat contacted with the above-mentioned catalyst in the presence of hydrogen gas, whereby tetramethylbenzene and xylene are obtained as main products. The above reaction may be carried out by employing a fixed bed or fluidized bed, or by other procedure, but in view of ease in operation and other merits it is preferred to conduct the reaction in the vapor phase by employing a fixed bed. The reaction temperature is 250° to 550° C., preferably 30° to 450° C. The reaction is accomplished by the presence of hydrogen. The presence of hydrogen increases the activity of the catalyst and decreases the amount of carbonaceous matters depositing on the catalyst. The amount of hydrogen is not critical, and sufficient results are attained by the presence of hydrogen in an amount of less than 50 moles per mole of the starting hydrocarbon. A preferable molar ratio of hydrogen to the starting hydrocarbon is in a range of from 5 to 20. The reaction is allowed to advance at atmospheric pressure but it is preferred to effect the reaction at a pressure of 10 to 30 kg/cm². The reaction time factor W/F (g-cat.hr./g-mole) (in which W stands for the catalyst weight and F stands for the feed rate of the starting aromatic hydrocarbon) is not critical in this reaction, but in order to attain a high conversion it is desired to maintain the time factor at about 25 to about 600, especially 50 to 300. A preferable concentration in the starting feed of trimethylbenzene to be used as starting material is above 50 mole percent. The $C_{10}$ aromatic hydrocarbon in the reaction liquid consists predominantly of tetramethylbenzene. The trimethylbenzene feed is usually a mixture of 1,2,3-trimethylbenzene, 1,2,4-trimethylbenzene and 1,3,5-trimethylbenzene, and the resulting tetramethylbenzene product is also obtained in the form of an isomer mixture of 1,2,3,4-tetramethylbenzene, 1,2,3,5-tetramethylbenzene and 1,2,4,5-tetramethylbenzene. The proportion of these three isomers of tetramethylbenzene in the product is determined to have a constant value by the thermal equilibrium regardless of the proportion of the isomers of trimethylbenzene in the feed. The most industrially important isomer among the isomers of tetramethylbenzene is 1,2,4,5-tetramethylbenzene, namely, durene.

Demands for durene as a starting material for heat-resistant plasticizers or heat-resistant high molecular substances have increased recently with development in the art of heat-resistant resins. Durene has heretofore obtained by a method comprising concentrating durene contained in a catalytically reformed oil or the like, thereby crystallizing the same and separating the crystal, or by a method comprising methylating pseudocumene. The former method is defective in that since the concentration of durene in the starting aromatic hydrocarbon mixture is too low, it is expensive perform the separation and purification of the product and a great restriction is imposed on the amount of the intended durene produced. The latter method uses a Friedel-Crafts catalyst or an acid catalyst such as HF and effects methylation of psedocumene of relatively high purity with an aid of such catalyst. Therefore, in the latter method expensive and anti-corrosive reactors must be used for rectification and purification of pseudocumene and separation of the product from the catalyst; accordingly, the cost of durene is extremely high. For solving these problems a method of disproportionating trimethylbenzene with a solid acid catalyst has been proposed. However, conventional solid acid catalyst such as silica-alumin and alumina-boria are very inferior in the disproportionating activity, and the activity thereof is greatly lowered with the lapse of time and life thereof is very short. Because of such defects of the conventional solid acid catalysts, the above proposal cannot be utilized industrially.

On the other hand, in accordance with the process of this invention, it is possible to disproportionate trimethylbenzene at high conversion and high selectivity with a prolonged life of the catalyst. Further, the process of this invention is advantageous in that deposition of carbonaceous matters on the catalyst and decomposition of aromatic nuclei can be greatly decreased.

In accordance with another preferably embodiment of the transalkylation process of this invention, ethyltoluene is selected as the starting aromatic hydrocarbon of nine carbon atoms, and a feed containing ethyltoluene and benzene as main components is heat contacted in the presence of hydrogen gas with the above-mentioned catalyst, whereby ethylbenzene and toluene are obtained as reaction product. The above process may be advantageously carried out either by the catalytic liquid phase reaction or vapor phase catalytic reaction. The reaction temperature is 180° to 450° C., preferably 250° to 400° C. The reaction may be carried out at atmospheric or elevated pressure, but the reaction is generally effected at a pressure of 5 to 250 kg/cm². Each of ethyltoluene and benzene is fed at a liquid hourly space velocity of 0.1 to 20 $hr^{-1}$, preferably 0.2 to 5 $hr^{-1}$. The ethyltoluene/benzene molar ratio is not critical, but the ethyltoluene/benzene molar ratio is generally 2/1 to 1/20, preferably 1/1 to 1/10. It is desired to feed together with the hydrocarbon feed 0.5 to 100 moles, especially 5 to 60 moles of hydrogen per mole of the hydrocarbon feed.

Solid acid catalysts such as silica-alumina catalysts, metal oxide-silica catalysts and alumina type catalysts have been heretofore used for the transalkylation of ethyltoluene and benzene, but they have various defects such as a short catalyst life and low conversion. On the other hand, the process of this invention can produce ethylbenzene at high conversion and high yield and can overcome such defects.

This invention will be now detailed by referring to examples.

In examples the degree of dealkalization was measured by analyzing the alkali component remaining in the dealkalized mordenite by means of an electron microprobe X-ray analyzer.

The following abbreviations are used in examples:

Be for benzene; T for toluene; X for xylene; EB for ethylbenzene; ET for ethyltoluene; TMB for trimethylbenzene; 135TMB for mesitylene; 124TMB for pseudocumene; 123TMB for hemimellitene; TeMB for tetramethylbenzene; and PeMB for pentamethylbenzene.

In examples the value of the "ringloss" is used as a measure for indicating the degree of occurrence of the side-reaction and accordingly, deposition of carbon on the catalyst, such value being obtained by determining the amount of lower hydrocarbons contained in the purge gas by the customary gas chromatography and dividing the weight of the carbon contained in the lower hydrocarbons by the weight of the carbon contained in the starting hydrocarbon.

EXAMPLE 1 a. "Sodium-Zeolon" (synthetic mordenite manufactured by Norton Co., U. S. A.) was subjected to a dealkalizing treatment at 85° – 100° C. with an aqueous solution of 5 weight percent ammonium chloride for 2 days.

b. A natural mordenite produced at Miyagi Prefecture, Japan was treated with an aqueous solution of 10 weight percent ammonium chloride at 70° C. for 3 days.

c. A mordenite synthesized from water glass and sodium aluminate was treated with a 3N hydrochloric acid aqueous solution at 90° C. for 1 day and then with an aqueous solution of 10 weight percent ammonium chloride at 70° C. for 2 days.

The above dealkalized mordenites (in each of them the dealkalization degree was more than 90 mole percent) were dried for 24 hours at 120° C., molded into pellets of 5 × 5 mm, and calcined at 520° C. for 15 hours. The so prepared catalyst were named Catalyst A, B and C.

By employing 9.7 g. each of Catalysts A, B and C, respectively, the disproportionation of pseudocumene (purity being more than 98 percent) was carried out under the following conditions:

| | |
|---|---|
| Reaction pressure | 30 kg/cm² |
| Feed rate of pseudocumene | 11.7 g/hr |
| Feed rate of hydrogen | 24 N-l/hr |

The results at the point 6 hours after the initiation of the reaction are shown in Table 1 below.

TABLE 1

| Catalysts | Reaction temperature (° C.) | Composition of product liquid (mole percent) | | | | | |
|---|---|---|---|---|---|---|---|
| | | Be | T | X | TMB | TeMB | PeMB |
| A | 380 | 0.2 | 3.8 | 21.6 | 51.6 | 22.3 | 0.5 |
| B | 400 | 0.3 | 2.6 | 17.9 | 60.7 | 18.1 | 0.4 |
| C | 380 | 0.3 | 3.0 | 21.0 | 53.7 | 21.5 | 0.5 |

COMPARATIVE EXAMPLE 1

Silica-alumina (alumina content being 13 weight percent) prepared from water glass and aluminum nitrate by the co-gellation method was molded into pellets of 5 × 5 mm and calcined at 520° C. for 15 hours. By employing the so prepared catalyst, the disproportionation was carried out under the same conditions as adopted in Example 1. The results are shown in Table 2 below.

TABLE 2

| Reaction temperature (° C.) | Composition of product liquid (mole percent) | | | | | |
|---|---|---|---|---|---|---|
| | Be | T | X | TMB | TeMB | PeMB |
| 400 | 0.4 | 11.4 | 20.6 | 51.1 | 16.0 | 0.5 |
| 350 | 0 | 0.6 | 12.0 | 73.5 | 13.7 | 0.2 |

From comparison of results of Example 1 with those of Comparative Example 1, it is seen that in the reaction to obtain tetramethylbenzene by the disproportionation of trimethylbenzene Catalysts A, B and C of this invention have high disproportionating activity and high selectivity as compared with the conventional silica-alumina catalyst.

EXAMPLE 2

"Sodium-Zeolon" (synthetic mordenite manufactured by Norton Co., U. S. A.) was treated with an aqueous solution of 10 weight percent ammonium chloride at 85° – 100° C. for 2 days, dried at 120° C. for 24 hours and calcined at 520° C. for 6 hours to form a catalyst. By employing 9.7 g. of the so formed catalyst the disproportionation of a trimethylbenzene-containing mixture (TMB content of about 92 mole percent) was carried out at 380° C., under a pressure of 30 kg/cm², at a starting mixture feed rate of 11.7 g/hr and a molar ratio of hydrogen to the starting mixture of 10. The reaction was continued for 6 hours. The results at that time are shown in Table 3 below.

TABLE 3

| | Be | T | X | ET | 135-TMB | 124-TMB | 123-TMB | TeMB | PeMB |
|---|---|---|---|---|---|---|---|---|---|
| Composition of starting mixture (mole percent) | | | | | 7.5 | 10.6 | 79.8 | 2.1 | |
| Composition of product liquid (mole percent) | 0.3 | 5.9 | 23.1 | Trace | 13.2 | 30.3 | 4.4 | 22.8 | Trace |

EXAMPLE 3 a. "Sodium Zeolon" (synthetic mordenite manufactured by Norton Co., U. S. A.) was dealkalized with the use of an aqueous solution of 10 weight percent ammonium chloride at 85° – 100° C. for 2 days, followed by sufficient water-washing and drying at 120° C. On the so dealkalized mordenite (alkalization degree being more than 90 mole percent), silver nitrate was supported in an amount of 3 weight percent calculated as metal silver by the impregnation method. The composition was then dried at 120° C. for 24 hours, molded into pellets of 5 × 5 mm and calcined at 520° C. for 15 hours to form a catalyst (Catalyst A).

b. A natural mordenite produced at Miyagi Prefecture, Japan was treated with an aqueous solution of 10 weight percent ammonium chloride at 75° C. for 2 days, followed by sufficient water-washing and drying at 120° C. On the so obtained dealkalized mordenite tungstic acid was supported in an amount of 3 weight percent calculated as metal tungsten by the impregnation method. The composition was dried at 120° C., molded into pellets of 5 × 5 mm and calcined at 520° C. for 15 hours to form a catalyst (Catalyst B).

c. A natural mordenite produced at Miyagi Prefecture, Japan was treated with an aqueous solution of 5 weight percent ammonium nitrate at 75° C. for 3 days. The so obtained dealkalized mordenite was dipped in an aqueous solution of 5 weight percent silver nitrate of an amount same as that of the mordenite for 12 hours. Then the resulting composition was dried, molded into pellets of 5 × 5 mm and calcined at 520° C. for 6 hours to form a catalyst (Catalyst C).

By employing 9.7 g. each of Catalysts A, B and C, respectively, the disproportionation of pseudocumene (purity being more than 98 percent) was carried out at a pressure of 30 kg/cm², a starting material feed rate of 11.7 g/hr and a hydrogen feed rate of 24 N-l/hr. The results are shown in Table 4 below.

TABLE 4

| Catalyst | Reaction temperature (° C.) | Composition of product liquid (mole percent) | | | | | |
|---|---|---|---|---|---|---|---|
| | | Be | T | X | TMB | TeMB | PeMB |
| A | 360 | 0.3 | 3.7 | 21.4 | 52.0 | 22.0 | 0.6 |
| B | 400 | 0.3 | 3.3 | 19.8 | 55.4 | 20.6 | 0.6 |
| C | 380 | 0.3 | 2.9 | 19.5 | 56.9 | 19.9 | 0.5 |

EXAMPLE 4 a. "Sodium-Zeolon" (synthetic mordenite manufactured by Norton Co., U. S. A.) was dealkalized at 85° – 100° C. for 2 days with the use of an aqueous solution of 10 weight percent ammonium chloride, followed by sufficient water-washing and drying at 120° C. On the so dealkalized mordenite, ammonium molybdate was supported in an amount of 3 weight percent calculated as molybdenum by the impregnation method. The resulting composition was dried at 120° C. for 24 hours, molded into pellets of 5 × 5 mm and calcined at 520° C. for 15 hours to form a catalyst (Catalyst A).

b. "Sodium-Zeolon" (synthetic mordenite manufactured by Norton Co., U. S. A.) was dealkalized at 85° – 100° C. for 2 days with the use of an aqueous solution of 5 weight percent ammonium nitrate. On the so dealkalized mordenite, chromium nitrate was supported in an amount of about 1.5 weight percent by the ion-exchange method using an aqueous solution of 5 weight percent chromium nitrate. Then, the resulting composition was dried at 120° C. for 24 hours, molded into pellets of 5 × 5 mm and calcined at 520° C. for 15 hours to form a catalyst (Catalyst B).

c. "Sodium-Zeolon" (synthetic mordenite manufactured by Norton Co., U. S. A.) was dealkalized at 85° – 100° C. for 2 days with the use of an aqueous solution of 10 weight percent ammonium chloride. The so dealkalized mordenite was subjected to a cation-exchange treatment at 85° – 100° C. with an aqueous solution of 5 weight percent cobalt nitrate for 12 hours. By this treatment, about 5 percent of ammonium ions was substituted by cobalt. The so treated mordenite was then washed with water sufficiently and dried at 120° C. On the so dried mordenite, ammonium molybdate was supported in an amount of 3 weight percent calculated as molybdenum by the impregnation method. The resulting composition was dried at 120° C. for 24 hours, molded into pellets of 5 × 5 mm and calcined at 520° C. for 15 hours to to form a catalyst (Catalyst C).

By employing the so prepared Catalysts A, B and C of this Example and Catalyst A prepared in Example 3, the disproportionation reaction was effected for 5 hours under the following conditions:

Composition of starting material (mole percent)

| Ethyltoluene | 1.5 |
| Mesitylene | 4.5 |
| Psedocumene | 93.5 |
| Hemimellitene | 0.5 |
| N content | 180 p.p.m. |
| S content | 180 p.p.m. |
| Feed rate of starting material | 11.7 g/hr |
| Time factor W/F | 100 g-cat.hr./g-mole |
| Reaction temperature | 390° C. |
| Molar ratio of hydrogen to starting material | 15 |

The results at the point 5 hours after the initiation of the reaction are shown in Table 5 below.

TABLE 5

| Catalyst | TMB conversion (mole %) | Yield of X + TeMB (mole %) | TeMB/X (molar ratio) |
|---|---|---|---|
| Catalyst A of Example 3 | 48 | 43 | 0.90 |
| Catalyst A of Example 4 | 45 | 41 | 0.93 |
| Catalyst B of Example 4 | 40 | 37 | 0.90 |
| Catalyst C of Example 4 | 50 | 43 | 0.88 |

EXAMPLE 5

A mordenite synthesized from water glass and sodium aluminate in a customary manner was treated with a 3N hydrochloric acid aqueous solution at 85° – 100° C. for 24 hours and then with an aqueous solution of 10 weight percent ammonium chloride at 70° C. for 2 days, followed by sufficient water-washing and drying at 120° C. On the so treated mordenite, silver nitrate was supported in an amount of 5 weight percent calculated as silver metal by the impregnation method. The composition was dried at 120° C. for 24 hours, molded into pellets of 5 × 5 mm and calcined at 520° C. for 15 hours to form a catalyst. By employing 9.7 g. of the so formed catalyst, the disproportionation of a mixture containing 92 mole percent trimethylbenzene was carried out at a feed rate of the starting mixture of 20 g/hr, a pressure of 30 kg/cm$^2$, a temperature of 390° C. and a molar ratio of hydrogen to the starting mixture of 10. The results are shown in Table 6 below.

TABLE 6

| | T | X | ET | 135-TMB | 124-TMB | 123-TMB | TeMB |
|---|---|---|---|---|---|---|---|
| Composition of starting mixture (mole percent) | | | 7.5 | 10.6 | 79.8 | 2.1 | |
| Composition of product liquid (mole percent) | 6.6 | 24.2 | 0.6 | 15.3 | 30.9 | 4.9 | 17.5 |

EXAMPLE 6 a. "Sodium-Zeolon" (synthetic mordenite manufactured by Norton Co., U. S. A.) was dealkalized at 85° – 100° C. for 2 days with an aqueous solution of 10 weight percent ammonium chloride, followed by drying at 120° C. Then, the so treated mordenite was mixed with 20 weight percent, based on the dried mordenite, of α-aluminum fluoride prepared by calcining β-aluminum fluoride trihydrate at 400° C. for 3 hours, and the mixture was calcined at 520° C. for 15 hours. On the calcined product, copper nitrate was supported in an amount of 5 weight percent calculated as copper metal by the impregnation method using an aqueous solution of copper nitrate. Thereafter, the composition was dried at 120° C. for 24 hours, molded into pellets of 5 × 5 mm and calcined at 520° C. for 15 hours to form a catalyst (Catalyst A).

b. A natural mordenite produced at Miyagi Prefecture, Japan was dealkalized at 75° C. for 2 days with an aqueous solution of 10 weight percent ammonium chloride, followed by drying at 120° C. The so treated mordenite was mixed with 20 weight percent, based on the dried mordenite, of β-aluminum fluoride trihydrate, and the mixture was dipped into an aqueous solution of silver nitrate to support thereon 3 weight percent, calculated as silver metal, of silver nitrate, followed by drying at 120° C. for 24 hours. Then, the dried composition was molded into pellets of 5 × 5 mm and calcined at 520° C. for 15 hours to form a catalyst (Catalyst B).

By employing 9.7 g. each of the so obtained Catalysts A and B, respectively, the disproportionation of pseudocumene was carried out under the same conditions as in Example 1. The results are shown in Table 7 below.

TABLE 7

| Catalyst | Reaction temperature (° C.) | TMB conversion (mole percent) | Yield of X + TeMB (mole percent) | TeMB/X molar ratio | Ring loss |
|---|---|---|---|---|---|
| A | 350 | 51 | 44 | 1.0 | 0.78 |
| B | 370 | 49 | 43 | 0.96 | 0.90 |

EXAMPLE 7

"Sodium-Zeolon" (synthetic mordenite manufacture by Norton Co., U. S. A.) was dealkalized at 85° – 100° C. for 2 days with an aqueous solution of 10 weight percent ammonium chloride, and then the so dealkalized mordenite was subjected to an ion-exchange treatment with an aqueous solution of 5 weight percent silver nitrate to introduce therein 4 weight percent of silver, followed by drying at 120° C. The dried product was mixed with 20 weight percent, based on the dried product, of β-aluminum fluoride trihydrate, and the mixture was calcined at 520° C. for 15 hours to form a catalyst. By employing 9.7 g. of the so obtained catalyst, the disproportionation of a mixture containing about 92 mole percent of trimethylbenzene was carried out at a starting mixture feed rate of 11.7 g/hr, a reaction pressure of 30 kg/cm² a reaction temperature of 370° C. and a molar ratio of hydrogen to the starting mixture of 10. The result are shown in Table 8 below.

fluorinated mordenite was impregnated with an aqueous solution of silver nitrate in an amount of 5 weight percent calculated as silver, followed by drying at 120° C. for 24 hours. The dried product was molded into pellets of 5 × 5 mm and calcined at 520° C. for 15 hours to form a catalyst (Catalyst B).

By employing 9.7 g. each of the so obtained Catalysts A and B, respectively, the disproportionation reaction was effected under the same conditions as adopted in Example 1. The results are shown in Table 10 below.

TABLE 8

| | Be | T | X | ET | 135-TMB | 124-TMB | 123-TMB | TeMB | PeMB |
|---|---|---|---|---|---|---|---|---|---|
| Composition of starting mixture (mole percent) | | | | 7.5 | 10.6 | 79.8 | 2.1 | | |
| Composition of product liquid (mole percent) | 5.9 | 23.9 | 0.9 | | 15.5 | 31.3 | 5.1 | 17.4 | |

EXAMPLE 8 a. "Sodium-Zeolon" (synthetic mordenite manufactured by Norton Co., U.S.A.) was dealkalized at 85° – 100° C. for 2 days with an aqueous solution of 5 weight percent ammonium chloride, followed by drying at 120° C. and calcination at 520° C. for 15 hours to form a catalyst (Catalyst A).

b. On the Catalyst A was supported 5 weight percent of silver by the impregnation method using an aqueous solution of silver nitrate, followed by drying at 120° C. for 24 hours and calcination at 560° C. for 6 hours (Catalyst B).

c. The Catalyst A was mixed with 20 weight percent of β-aluminum fluoride trihydrate, and the mixture was calcined at 520° C. for 15 hours, and then on the so obtained product was supported 5 weight percent of silver by the impregnation method using an aqueous solution of silver nitrate, followed by drying at 120° C. for 24 hours and calcination at 560° C. for 6 hours (Catalyst C).

By employing the so formed Catalysts A, B and C, the disproportionation of pseudocumene was carried out at a pseudocumene feed rate of 23.4 g/hr, a time factor W/F of 50 g.-cat.hr./g-mole, a reaction temperature of 340° C., a reaction pressure of 30 kg/cm², and a hydrogen-to-pseudocumene molar ration of 10. The results are shown in Table 9 below.

TABLE 10

| | Reaction temp. (°C.) | TMB conv. (mole %) | Yield of X+TeMB (mole %) | TeMB/X molar ratio | Ringloss |
|---|---|---|---|---|---|
| Catalyst A | 340 | 49 | 44 | 1.1 | 0.92 |
| Catalyst B | 370 | 47 | 42 | 0.95 | 0.86 |

EXAMPLE 10

A mordenite synthesized from water glass and sodium aluminate was treated with a 10 weight percent ammonium nitrate aqueous solution at 70° C. for 2 days, and then with a 5 weight percent chromium nitrate aqueous solution for 12 hours, followed by sufficient water-washing and drying. The so dealkalized mordenite was impregnated with ammonium fluoride in an amount of 4 weight percent calculated as fluorine. The so obtained mordenite composition was dried at 120° C. for 24 hours, molded into pellets of 5 × 5 mm and calcined at 520° C. for 15 hours to form a catalyst. By employing 9.7 g. of the so formed catalyst, the disproportionation of trimethylbenzene (purity being 92 mole percent) was carried out at a starting material feed rate of 20 g/hr, a reaction pressure of 30 kg/cm², a reaction temperature of 370° C. and a hydrogen-to-starting material molar ratio of 10. The results are shown in Table 11 below.

TABLE 11

| | Be | T | X | ET | 135-TMB | 124-TMB | 123-TMB | TeMB | PeMB |
|---|---|---|---|---|---|---|---|---|---|
| Composition of starting material (Mole percent) | | | | 7.5 | 10.6 | 79.8 | 2.1 | | |
| Composition of product liquid (mole percent) | 6.0 | 23.8 | 1.6 | | 15.1 | 30.9 | 5.0 | 17.9 | 0.3 |

TABLE 9

| Catalyst | TMB conversion (mole %) | Yield of X+TeMB (mole %) | TeMB/X molar ratio | Ringloss |
|---|---|---|---|---|
| Catalyst A (dealkalized mordenite) | 23 | 20 | 1.0 | 0.6 |
| Catalyst B (A+Ag) | 37 | 32 | 0.95 | 1.6 |
| Catalyst C (A+β-AlF₃·3H₂O+Ag) | 46 | 42 | 1.0 | 0.90 |

EXAMPLE 9 a. "Sodium-zeolon" (synthetic mordenite manufactured by Norton Co., U. S. A.) was dealkalized at 85° – 100° C. for 2 days with an aqueous solution of 10 weight percent ammonium nitrate, and the dealkalized mordenite was impregnated with 3 weight percent of fluorine from an aqueous solution of ammonium fluoride and then with 3 weight percent of silver from an aqueous solution of silver nitrate, followed by drying at 120° C. for 15 hours. The dried product was molded into pellets of 5 × 5 mm and calcined at 520° C. for 15 hours to form a catalyst (Catalyst A).

b. A natural catalyst produced at Miyagi Prefecture, Japan was dealkalized with an aqueous solution of 10 weight percent ammonium chloride at 75° C. for 2 days. The so dealkalized mordenite was impregnated with hydrofluoric acid in an amount of 3 weight percent calculated as fluorine, followed by drying at 120° C. and calcination at 500° C. overnight. The so

EXAMPLE 11 a. A natural mordenite produced at Miyagi Prefecture, Japan, capable of passing through a 40 mesh sieve (100 g.) was treated with 300 ml. of a 10 weight percent ammonium chloride aqueous solution at 70° – 80° C. for 48 hours, the treating liquid being changed with fresh one 24 hours after initiation of the treatment. The solids were separated by filtration, washed sufficiently with water, and dried at 120° – 150° C. The dried product was molded into pellets of 5 × 5 mm and calcined at 520° C. for 8 hours to form a catalyst (Catalyst A).

b. The same mordenite as used in (a) was subjected to the same ammonium chloride treatment as in (a), and the water-washing and drying were conducted in the same manner as in (a). The resulting mordenite was impregnated with a silver nitrate aqueous solution in an amount of 5 weight percent calculated as silver, followed by drying at 120° – 150° C. The dried product was molded into pellets of 5 × 5 mm and calcined at 520° C. for 8 hours to form a catalyst (Catalyst B).

c. The same mordenite as used in (a) was treated with ammonium chloride, water-washed and dried in the same manner as in (a). The resulting mordenite was mixed with 20 weight percent, based on the dried mordenite, of aluminum fluoride, and the mixture was impregnated with a silver nitrate aqueous solution in an amount of 5 weight percent calculated as silver metal, followed by drying at 120° – 150° C. The dried product was molded into pellets of 5 × 5 mm and calcined at 520° C. for 8 hours to form a catalyst (Catalyst C).

d. The NH₄-substituted mordenite (20 g.) prepared by conducting the ammonium chloride treatment, water-washing and drying in the same manner as in (a) was treated with 60 ml. of a 5 weight percent silver nitrate aqueous solution at 70° – 80° C. for 48 hours, the treating liquid being changed with fresh one 24 hours after initiation of the treatment. Thus, silver nitrate was supported in an amount of 9 weight percent calculated as metal silver by this treatment. Then, the silver-incorporated mordenite was washed with water sufficiently and dried at 120° – 150° C. The dried product was molded into pellets of 5 × 5 mm and calcined at 520° C. for 8 hours to form a catalyst (Catalyst D).

e The silver-incorporated mordenite prepared in the same manner as in (d) was mixed with 20 weight percent, based on the dried mordenite, of aluminum fluoride. The resulting composition was molded into pellets of 5 × 5 mm and calcined at 520° C. for 8 hours to form a catalyst (Catalyst E).

By employing 12 g. of each of the so prepared Catalysts A, B, C, D and E, respectively, the transalkylation of ethyltoluene and benzene (ET/Be molar ratio of 3/17) was carried out at a reaction pressure of 30 kg/cm$^2$, a reaction temperature of 320° C., a hydrogen feed rate of 25 N-1/hr and a starting material feed rate of 12 g/hr. The results are shown in Table 12 below.

TABLE 12

| Catalyst | ET conversion (mole %) | EB selectivity (mole %) | Content of EB in C$_8$ automatic hydrocarbons (mole %) |
|---|---|---|---|
| A | 74.5 | 78.4 | 97.0 |
| B | 84.0 | 73.8 | 97.5 |
| C | 85.8 | 79.7 | 96.8 |
| D | 83.0 | 74.2 | 97.0 |
| E | 86.0 | 78.1 | 95.5 |

COMPARATIVE EXAMPLE 2

Commercially available silica-alumina was molded into pellets of 5 × 5 mm and calcined at 520° C. By employing the so calcined silicaalumina as catalyst, the transalkylation was effected at 350° C. under the same conditions as in Example 11. The results are shown in Table 13 below.

TABLE 13

| Catalyst | ET conversion (mole %) | EB selectivity (mole %) | Content of EB in C$_8$ aromatic hydrocarbons (mole %) |
|---|---|---|---|
| Silica-alumina | 49.6 | 39.0 | 63.1 |

WHAT WE CLAIM IS:

1. A process for the transalkylation of aromatic hydrocarbons of nine carbon atoms which comprises heat contacting the starting feed containing at least one aromatic hydrocarbon of nine carbon atoms as a main component in the presence of hydrogen gas with a catalyst consisting of:
  composition consisting essentially of a dealkalized mordenite, an aluminum fluoride and at least one metal selected from metals of Group Ib or VIa of Mendelejeff's Periodic Table.

2. The process of claim 1 wherein the dealkalization degree of said dealkalized mordenite is at least 60 mole percent.

3. The process of claim 1 wherein said dealkalized mordenite is a dealkalized mordenite which has been fluorinated with a fluorinating agent.

4. A process for the disproportionation of trimethylbenzene which comprises heat contacting trimethylbenzene in the presence of hydrogen gas with a catalyst
  composition consisting essentially of a dealkalized mordenite, an aluminum fluoride and at least one metal selected from metals of Group Ib or VIa of the Periodic Table.

5. A process for the preparation of ethylbenzene which comprising heat contacting ethyltoluene and benzene in the presence of hydrogen gas with a catalyst selected from the group consisting of:
  a. dealkalized mordenites,
  b. compositions composed of a dealkalized mordenite and at least one metal selected from metals of Group Ib or VIa of the Periodic Table, and
  c. compositions composed of a dealkalized mordenite, an aluminum fluoride and at least one metal selected from metals of Group Ib or VIa of Mendelejeff's Periodic Table.

6. The process of claim 5 wherein said metal is present in the catalyst composition in an amount such that the metal content is 0.05 to 30 percent by weight.

7. The process of claim 5 wherein said metal is present in the catalyst composition in an amount such that the metal content is 0.05 to 10 percent by weight.

8. The process of claim 1 wherein said aluminum fluoride is present in said catalyst composition in an amount of 1 to 40 percent by weight based on the weight of the dealkalized mordenite.

9. The process of claim 1 wherein said aluminum fluoride is present in said catalyst composition in an amount of 5 to 20 percent by weight based on the weight of the dealkalized mordenite.

10. The process of claim 1 wherein said catalyst composition further contains a metal of Group VIII of Mendelejeff's Periodic Table in an amount of 0.05 to 5 percent by weight based on the weight of the catalyst composition.

* * * * *

UNITED STATES PATENT OFFICE
CERTIFICATE OF CORRECTION

Patent No. 3,671,602          Dated    June 20, 1972

Inventor(s)    Takehisa Inoue et al.

It is certified that error appears in the above-identified patent and that said Letters Patent are hereby corrected as shown below:

Column 12, claim 4, line 6 thereof: delete "the" and insert -- Mendelejeff's --. Column 12, claim 5, lines 3 and 4, "selected from the group consisting of:" should be canceled and in column 12, Claim 5, lines 5-8 should be deleted in their entirety; column 12, Claim 5, line 9, "(c) compositions composed" should be deleted and -- composition consisting essentially -- should be inserted therefor.

Signed and sealed this 1st day of October 1974.

(SEAL)
Attest:

McCOY M. GIBSON JR.                C. MARSHALL DANN
Attesting Officer                   Commissioner of Patents